(12) United States Patent
Birke et al.

(10) Patent No.: US 9,296,302 B2
(45) Date of Patent: Mar. 29, 2016

(54) CHARGING DEVICE FOR AN ENERGY STORE AND METHOD FOR OPERATING SUCH A CHARGING DEVICE

(75) Inventors: Peter Birke, Glienicke/Nordbahn (DE); Stefan Bonnekessel, Berlin (DE); Björn Demitter, Berlin (DE); Michael Schiemann, Berlin (DE); Hans-Georg Schweiger, Ingolstadt (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 975 days.

(21) Appl. No.: 13/390,178

(22) PCT Filed: Jul. 28, 2010

(86) PCT No.: PCT/EP2010/060939
§ 371 (c)(1),
(2), (4) Date: Jun. 8, 2012

(87) PCT Pub. No.: WO2011/018335
PCT Pub. Date: Feb. 17, 2011

(65) Prior Publication Data
US 2012/0242288 A1    Sep. 27, 2012

(30) Foreign Application Priority Data
Aug. 11, 2009   (DE) .................... 10 2009 036 943

(51) Int. Cl.
*H02J 7/00* (2006.01)
*B60L 11/18* (2006.01)

(52) U.S. Cl.
CPC ......... *B60L 11/1809* (2013.01); *B60L 11/1861* (2013.01); *H02J 7/0073* (2013.01);
(Continued)

(58) Field of Classification Search
CPC ............ B60L 11/1809; B60L 11/1816; B60L 11/1851; B60L 11/1861; B60L 11/1848; Y02T 10/7005; Y02T 10/7088; Y02T 90/14; Y02T 90/128; Y02T 90/163; H02J 7/00; H02J 7/007; H02J 7/10
USPC ........................................................ 320/109
See application file for complete search history.

(56) References Cited

U.S. PATENT DOCUMENTS 5,623,194 A    4/1997  Boll et al. .................... 320/15
6,072,299 A *  6/2000  Kurle et al. ................... 320/112
(Continued)

FOREIGN PATENT DOCUMENTS

CN    200947552 Y    9/2007  ............. H02J 7/00
CN    101257218 A1   9/2008  ............. H01M 10/44
(Continued)

OTHER PUBLICATIONS

Chinese Office Action, Application No. 201080035567.2, 16 pages, Nov. 6, 2013.
(Continued)

*Primary Examiner* — Samuel Berhanu
*Assistant Examiner* — Tessema Kebede
(74) *Attorney, Agent, or Firm* — Slayden Grubert Beard PLLC

(57) ABSTRACT

A charging device for an energy store, e.g., a lithium ion battery in an electric vehicle, may include a circuit for adjusting the charging device in a full charging mode or a parked charging mode, wherein the charging device is set up for producing a fully charged state of the energy store in full charging mode, and for producing a parked charged state of the energy store in parked charging mode, wherein the parked charging state corresponds to a reduced charge state of the energy store. Methods for operating such a charging device, and an electric vehicle having such a charging device, may also be provided.

13 Claims, 1 Drawing Sheet

(52) U.S. Cl.
CPC ............ *Y02T10/7005* (2013.01); *Y02T 10/705* (2013.01); *Y02T 10/7011* (2013.01); *Y02T 10/7044* (2013.01); *Y02T 90/14* (2013.01)

(56) References Cited

U.S. PATENT DOCUMENTS

| | | | |
|---|---|---|---|
| 6,664,764 B1 | 12/2003 | Odaohhara | 320/132 |
| 6,762,945 B2 * | 7/2004 | Morgen | 363/17 |
| 7,679,336 B2 * | 3/2010 | Gale et al. | 320/155 |
| 8,024,081 B2 | 9/2011 | Fleckner et al. | 701/22 |
| 2004/0066171 A1 * | 4/2004 | Mori | 320/132 |
| 2007/0228836 A1 * | 10/2007 | Teichmann | 307/80 |
| 2008/0007202 A1 * | 1/2008 | Pryor | 320/104 |
| 2008/0079374 A1 * | 4/2008 | Wobben | B60L 11/1811 318/139 |
| 2008/0150490 A1 * | 6/2008 | Koziara et al. | 320/137 |
| 2008/0211230 A1 * | 9/2008 | Gurin | 290/2 |
| 2009/0140698 A1 * | 6/2009 | Eberhard et al. | 320/152 |
| 2009/0192655 A1 | 7/2009 | Ichikawa et al. | 700/291 |
| 2011/0282535 A1 | 11/2011 | Woody et al. | 701/22 |
| 2012/0242288 A1 | 9/2012 | Birke et al. | 320/109 |

FOREIGN PATENT DOCUMENTS

| | | | | |
|---|---|---|---|---|
| DE | 4344368 | C1 | 5/1995 | G01R 31/36 |
| DE | 29707965 | U1 | 8/1997 | B60L 11/18 |
| DE | 102006034933 | A1 | 1/2008 | B60W 20/00 |
| DE | 102008050021 | A1 | 5/2009 | H02J 7/00 |
| EP | 2056420 | A1 | 5/2009 | H02J 3/00 |
| JP | 2007282383 | A | 10/2007 | B60L 11/18 |
| WO | 2011/018335 | A2 | 2/2011 | B60L 11/18 |

OTHER PUBLICATIONS

Chinese Office Action, Application No. 201080035567.2, 12 pages, Apr. 16, 2014.
International PCT Search Report and Written Opinion, PCT/EP2010/060939, 18 pages, Mar. 30, 2011.

* cited by examiner

CHARGING DEVICE FOR AN ENERGY STORE AND METHOD FOR OPERATING SUCH A CHARGING DEVICE

CROSS-REFERENCE TO RELATED APPLICATIONS

This application is a U.S. National Stage Application of International Application No. PCT/EP2010/060939 filed Jul. 28, 2010, which designates the United States of America, and claims priority to German Application No. 10 2009 036 943.0 filed Aug. 11, 2009, the contents of which are hereby incorporated by reference in their entirety.

TECHNICAL FIELD

The present disclosure relates to a charging device for an electrochemical and/or electrostatic energy store, a method for operating such a charging device, and/or an electric vehicle having such a charging device.

BACKGROUND

Modern electric vehicles such as, for example, vehicles which are driven exclusively by means of electrical energy, but also hybrid vehicles which have combinations with internal combustion engines or fuel cells, are often equipped with one or more electrochemical and, if appropriate, additional electrostatic energy stores. Both electric vehicles and hybrid vehicles are referred to as electric vehicles in this disclosure.

Electrochemical energy stores can be, for example, lead acid batteries, nickel metal hybrid batteries, nickel zinc batteries, lithium ion batteries or else combinations of these batteries. Combinations with double layer capacitors can also be used.

In order to charge such energy stores with energy, a charging process by means of a charging device may be necessary. In the case of an electric vehicle, such a charging device can be a stationary charging device or a charging device which is integrated into the electric vehicle, referred to as an on-board charger.

Each energy store is typically subject to an aging process depending on its mechanical and chemical structure. The speed of this aging process can depend on different factors, in particular on a charge state, a temperature, charging currents and discharging currents, and on charging ranges and discharging ranges during the operation of the energy store.

The degree of influence of these factors on the aging process of an energy store may depend on an operating state of the energy store. In particular, in the case of an electric vehicle the operating state of driving (cyclical aging) and that of parking (calendar aging) must always be considered separately from one another.

In the case of lithium ion batteries in an electric vehicle, for example in the operating state of parking in particular the charge state and the temperature are often decisive factors for the speed of the aging process of the energy store. A high charge state of over 60% with respect to the fully charged state at simultaneously high temperatures has a particularly unfavorable effect on the service life of such an energy store. Such conditions can, however, occur frequently since the parking constitutes on average 95% of the overall service life of a vehicle (in the case of a passenger car).

If an excessively high charge state during a parked state is therefore unfavorable for a long service life of such an energy store, in particular at high temperatures, this may run counter to a requirement for a high power level or a large quantity of energy which can be retrieved at any time, for example in the form of a large range in the case of an electric vehicle.

In addition, the case of planned extraction of power from the energy store occurring several days, or longer, into the future may be particularly problematic because the temperature profile is unknown until then. This makes the decision as to how an optimum charge state of the energy store is to be set in order to ensure the longest possible service life of the energy store more difficult.

Furthermore, the duration of a charging process cannot always be anticipated with sufficient accuracy since the network utilization factor of a power supply network in the future may be different from an instantaneous network utilization factor. For this reason, the problem of the optimum starting time of a charging process arises, which starting time should, furthermore, also depend on the planned extraction of energy in order to slow down the aging of the energy store as much as possible.

A power network, by means of which power suppliers make available electrical energy, is referred to herein as a power supply network. This may generally be a domestic network but, in particular, may also be a specific high power network which is suitable for particularly high power consumption levels, such as may occur during a charging process of an energy store in an electric vehicle.

The charging device may therefore be intended to lower the operating costs during the use of the energy store and at the same time permit the highest possible level of comfort of use, accompanied by the longest possible service life of the battery. Furthermore, a lengthened service life of the energy store may also permit environmental protection requirements to be taken into account. In order, as far as possible, to correspond in principle to these requirements which are becoming ever more important so that it is also possible to cope with the growing requirements in future, the charging device should help to facilitate the use of renewable energies which are already fed into the power supply networks by various power providers.

In addition, it may be expected in the future that for environmental-policy purposes current for electric vehicles will receive favorable tax treatment or that more favorable power tariffs will be provided for electric vehicles than for other consumers. A modern charging device should therefore make it possible to permit the user to select power tariffs which are particularly favorable and/or to enjoy tax benefits. In addition, large charging currents during the charging process may lead to additional stressing of the supply network, in particular at peak load times of the supply network. In particular, relatively high power prices can generally be expected at such peak load times.

Modern charging devices frequently contain programmable computing units with which, for example, switching on intervals or switching off intervals for charging processes can be programmed, for example in order to facilitate the use of favorable off-peak electricity at night. The programming is usually done manually or by means of a PC, which is frequently very awkward or even impossible if there is no PC available. The same applies to programmable devices which are connected to the energy store.

SUMMARY

In one embodiment, a charging device is provided for an energy store, in particular for a lithium ion battery in an electric vehicle, wherein the charging device contains a circuit for setting the charging device to a fully charging mode or a parked charging mode, wherein the charging device is configured to produce a fully charged state of the energy store in the fully charging mode and to produce a parked charge state of the energy store in the parked charging mode, wherein the parked charge state corresponds to a reduced charge state of the energy store.

In a further embodiment, the fully charging mode is activated on a standard basis and the charging device has a parking pushbutton key for activating the parked charging mode. In a further embodiment, the charging device is configured in the parked charging mode to pass on energy extracted from the energy store to energy consumers and/or comprises a module for feeding back the energy extracted from the energy store into a power supply network. In a further embodiment, the charging device has an interface for receiving and evaluating an activation signal, transmitted to the charging device, for producing the fully charged state or the parked charge state of the energy store, in particular via an Internet connection, via an SMS or via radio.

In a further embodiment, the charging device is configured to carry out a charging process with a target time and with a target charge state, wherein the charging device contains a computing unit for calculating a starting time of the charging process and of the target charge state on the basis of a current charge state of the energy store, available charging power of a power supply network, the target time and a planned energy consumption, wherein the charging device also has an input interface for inputting the target time and the planned energy consumption.

In a further embodiment, the charging device has a computing unit and an interface for receiving temperature information, in particular via an Internet connection, a power supply network, radio and/or GPS, wherein the charging device is configured to calculate a chronological charging power profile on the basis of a charging strategy, implemented in the computing unit, taking into account the temperature information.

In a further embodiment, the charging device has a computing unit and an interface for receiving information about at least one power supplier, in particular regarding power costs, a network utilization factor and/or power generating methods, in particular via an Internet connection, a power supply network, radio and/or GPS, wherein the charging device is configured to calculate a chronological charging power profile and/or to select the power supplier on the basis of a charging strategy, implemented in the computing unit, taking into account the received information.

In a further embodiment, the charging device has a computing unit and an interface for receiving and automatically processing a program code for changing or updating programming of the computing unit, in particular via an Internet connection or a power supply network. In a further embodiment, the charging device is configured to emit an identification code to a power supplier and/or producer, in particular via a power supply network, radio or the Internet.

In a further embodiment, the charging device contains a computing unit with an interface for exchanging data with the energy store, in particular for transmitting a program code to the energy store in order to change or update programming of the energy store and/or to receive data from the energy store, in particular fault messages, maintenance requests and/or repair requests, wherein the charging device also has an interface for exchanging data via the Internet, a power supply network and/or via radio, in particular with a producer, a workshop and/or a power supplier.

In a further embodiment, the charging device contains a computing unit with an interface for exchanging data with a device, in particular an electric vehicle, connected to the charging device, in particular for transmitting a program code in order to change or update programming of the device and/or to receive data from the device, in particular fault messages, operating information, maintenance requests and/or repair requests, wherein the charging device also has an interface for exchanging data via the Internet, a power supply network and/or via radio, in particular with a producer, a workshop and/or a power supplier.

In a further embodiment, the charging device contains a computing unit which is configured to carry out a utilization analysis of a power supply network, in particular on the basis of an analysis of a network voltage and a network frequency in the power supply network, and to calculate a chronological charging power profile on the basis of a programmed charging strategy taking into account the utilization analysis.

In another embodiment, a method is provided for operating a charging device for an energy store, in particular for a lithium ion battery in an electric vehicle, wherein the charging device is switched by means of a circuit into a fully charging mode or a parked charging mode, wherein in the fully charging mode a fully charged state is produced by the charging device, and in the parked charging mode a parked charge state of the energy store is produced, wherein the parked charge state corresponds to a reduced charge state of the energy store. In a further embodiment, such method is carried out with a charging device according to any of the embodiments discussed above.

In another embodiment, an electric vehicle is provided having a charging device according to any of the embodiments discussed above.

BRIEF DESCRIPTION OF THE DRAWINGS

Example embodiments will be explained in more detail below with reference to figures, in which.

DETAILED DESCRIPTION

Figure 1:
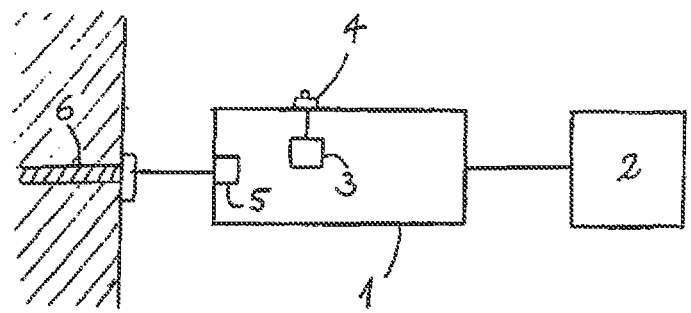
FIG. 1 shows a schematically illustrated charging device with a parking pushbutton key, according to certain embodiments of the present disclosure.

Certain embodiments of the present disclosure provide a charging device which may solve or at least attenuate one or more problems of conventional devices. For example, by means of the charging device it may be possible to control the charge state of an energy store in a way which is user friendly such that the aging process of the energy store is slowed down. Furthermore, a high degree of chronological flexibility with respect to the retrievable power or quantity of energy may be advantageously implemented, wherein as far as possible many or all the time-critical factors are to be taken into account. In addition, the ease of operation of the charging device may be improved with respect to energy consumption which is as cost-favorable and environmentally undamaging as possible. In particular, the charging device may be capable of being operated easily in terms of its programming, in particular with respect to the updating of the firmware of the charging device.

Certain embodiments relate to a charging device, a method for operating such a charging device, and/or an electric vehicle comprising such a charging device having features of particular independent claims and/or dependent claims.

According to certain embodiments, a particularly long service life of the energy store can be achieved by means of a charging device for an energy store, for example for an electrochemical and/or electrostatic energy store, in particular for a lithium ion battery in an electric vehicle, wherein the charging device contains a circuit for setting the charging device to a fully charging mode or a parked charging mode, wherein the charging device is configured to produce a fully charged state of the energy store in the fully charging mode and to produce a parked charge state of the energy store in the parked charging mode, wherein the parked charge state corresponds to a reduced charge state of the energy store.

In this context, the circuit can comprise electrotechnical and/or programmable components. The reduced charge state of the energy store is defined as a charge state of the energy store in which a reduced quantity of energy is stored in the energy store. In this context, the reduced quantity of energy is lower than a maximum quantity of energy which can be stored in the energy store.

The fully charged state of the energy store is defined as a charge state in which the maximum quantity of energy which can be stored is stored in the energy store. The parked charge state, which corresponds to the reduced charge state, is advantageously selected such that the service life of the energy store is as long as possible but at the same time a minimum quantity of energy stored not undershot in order, for example, to ensure a minimum range in the case of an electric vehicle. In the case of a lithium ion battery, the reduced quantity of energy in the reduced charge state (parked charge state) can be, for example, approximately 60% of the maximum quantity of energy which can be stored in the energy store (in the fully charged state thereof). If an instantaneous charge state of the energy store is present and is measured through the instantaneously stored quantity of energy over the reduced charge state (parked charge state), the parked charge state of the energy store can be set by means of the charging device which is switched to the parked charging mode, by corresponding extraction of energy from the energy store.

In certain embodiments, the fully charging mode may be activated on a standard basis and the charging device may have a parking pushbutton key for activating the parked charging mode. Such a charging device may therefore be defined by particularly easy operation. In the case of an on-board charging device in an electric vehicle, it may be particularly favorable if the parking pushbutton key is arranged in a driver's compartment of the vehicle, e.g., on an instrument panel.

In certain embodiments, the charging device may be configured in the parked charging mode to pass on energy extracted from the energy store to energy consumers and/or the charging device comprises a module for feeding back the energy extracted from the energy store into a power supply network. In some embodiments, this module may advantageously be a component which is approved for the power supply network of power suppliers, which component may be generally embodied as a power inverter module and may be configured to convert voltage taken up by the energy store into an alternating voltage which is synchronized with an alternating voltage of the power supply network. In this way, the charging device in the parked charging mode may be suitable for particularly efficient harnessing of the energy extracted from the energy store and is therefore particularly environmentally friendly and cost-effective.

Further, in certain embodiments the charging device may have an interface for receiving and evaluating an activation signal, transmitted to the charging device, for producing the fully charged state or the parked charge state of the energy store, in particular via an Internet connection, via an SMS or via radio. As a result, such a charging device may be suitable for setting the charge state after remote-control activation of the charging device. It may therefore be possible, for example, for a battery in an electric vehicle which is in a parked charge state with a reduced stored quantity of energy to be set, before the start of a journey, to a fully charged state with a maximum stored quantity of energy, by sending an SMS to the charging device in good time, in order in this way to have a maximum range of the vehicle available at the start of the journey.

In one embodiment, the charging device is configured to carry out a charging process with a target time and with a target charge state, wherein the charging device contains a computing unit for calculating a starting time of the charging process and of the target charge state, i.e. the quantity of energy stored in the energy store in this target charge state, on the basis of a current charge state of the energy store, available charging power of a power supply network, the target time and a planned energy consumption, wherein the charging device also has an input interface for inputting the target time and the planned energy consumption. In this context, the input interface can be located directly on the charging device and can be configured as a signal receiver or input keypad. In the case of an on-board charging device of an electric vehicle, this input keypad can, however, also be advantageously arranged in the driver's compartment.

Such a programmable charging device may have the advantage that the charge state can be optimized in a particularly user friendly and flexible way. In the case of a charging device for an electric vehicle, the target time, for example a planned departure time, can be input most easily in the format of a date entry and time entry. The planned energy consumption can, for example, be specified particularly easily in the form of a distance in kilometers. The starting time of the charging process which can be carried out in an automated fashion is determined here in such a way that the charge state which is matched to the planned energy consumption is reached just before the target time taking into account the available charging power. In this way, the energy store can remain for as long as possible in the energy-saving parked charge state and will on the other hand have a charge state with a sufficient stored quantity of energy at the desired time. Transmission of the target time and of the planned energy consumption via the Internet, SMS or by radio is particularly advantageous.

In certain embodiments the charging device may include a computing unit and an interface for receiving temperature information, in particular via an Internet connection, a power supply network, radio and/or GPS, wherein the charging device is configured to calculate a chronological charging power profile on the basis of a charging strategy, implemented in the computing unit, taking into account the temperature information and to automatically carry out a corresponding charging process.

This further development is based on the realization that the temperature can constitute an essential factor for the aging of the energy store. In particular, during the charging process the temperature plays an important role. For example, at excessively low temperatures what is referred to as lithium plating can occur in lithium cells when the charging currents are too high. It is known from conventional systems that temperature information is acquired by means of sensors on the charging device or the battery. In contrast, certain embodiments of the present disclosure have the advantage that temperature information can be supplied by means of corresponding service providers not only on a daily updated fashion but also over a relatively long time period. This may permit a charging strategy which is particularly good because it is predictive to be calculated, while at the same time the received temperature information is taken into account for a future time period for the setting of the charge state of the battery within this time period.

Further, in certain embodiments, which may permit particularly good cost control during the charging process, the charging device may include a computing unit and an interface for receiving information about at least one power supplier, in particular regarding power costs, a network utilization factor and/or power generating methods, in particular via an Internet connection, a power supply network, radio and/or GPS, wherein the charging device is configured to calculate a chronological charging power profile and/or to select the power supplier on the basis of a charging strategy, implemented in the computing unit, taking into account the received information, wherein the charging device is also configured to automatically carry out a corresponding charging process. In this context, the computing unit has, in particular, the functionality of what is referred to as a least cost router with which the most favorable power supplier can always be advantageously determined and set even during the charging process. By means of such a charging strategy which is implemented in the computing unit of the charging device, such a charging device may provide the advantage over known charging devices which can utilize a favorable off-peak night rate via a time setting that it has larger flexibility and can be automated more since the most favorable power tariff of various power suppliers can be selected automatically at any desired time.

In addition, in some embodiments, ecological objectives can be implemented by automated selection of a power supplier which makes available regeneratively acquired energy, by virtue of the fact that, for example, power is automatically drawn from such power providers which at a given time make available power which has been generated from renewable power sources.

In one embodiment of the charging strategy, said charging strategy is also configured to process switching commands of the power supplier which have been received via the interface, which switching commands signal the utilization factor of the power network or a changeover to a more favorable tariff.

For this purpose, such a charging device may have an operator interface via which a corresponding charging strategy can be set or selected, for example by selecting a particularly cost-effective or environmentally friendly, pre-programmed strategy. A charging strategy can, insofar as it is not already permanently implemented, be advantageously also set in this way by means of an Internet connection, radio or some other wireless or cable-bound interface.

Such features may provide a customer the advantage of charging the energy store under ecological and/or economically optimized conditions.

Further, in some embodiments, the charging device may include a computing unit configured to carry out a utilization analysis of a power supply network, in particular on the basis of an analysis of a network voltage and a network frequency in the power supply network and to calculate a chronological charging power profile on the basis of a programmed charging strategy taking into account the utilization analysis, and is also configured to automatically carry out a corresponding charging process. Such an internal utilization analysis can be based, for example, on a fast Fourier transformation (FFT) by virtue of the fact that the voltage profile in the supply network is analyzed and when secondary frequencies occur the network is evaluated as being utilized to a greater or lesser degree. This may permit, on the one hand, a reduction in the network utilization factor of a power supply network at peak load times or generally to chronological homogenization of such a network utilization factor. Furthermore, this may permit power costs to be saved by charging the battery with a particularly low network utilization factor, which is frequently also at reduced cost such as, for example, during the night with what is referred to as off-peak night charging.

Power costs can also be saved in embodiments in which the charging device is configured to emit an identification code to a power supplier and/or producer, in particular via a power supply network, radio or the Internet. As a result, for example an electric car can be identified as such for a power provider, permitting, if appropriate, a reduced power tariff to be achieved. This may be particularly advantageous if this permits more favorable tax treatment to be achieved.

The emission of the identification code may also be suitable for identifying the charge device and, under certain circumstances, energy stores which are connected to the charging device or an electric vehicle which is connected to the charging device as well as devices or other consumers which are contained in such an electric vehicle and which are connected to the charging device directly or via the energy store, compared to a producer or network supplier. Such identification is necessary in particular for authentication, in particular with respect to the reception of information or data such as, for example, firmware updates from a producer of such a charging device, energy store or electric vehicle.

In some embodiments, the charging device may have a computing unit and an interface for receiving and automatically processing a program code for changing or updating programming of the computing unit, in particular via an Internet connection or a power supply network. In this way, in particular firmware of the charging device can be changed or updated via the Internet connection or the power supply network without further data carriers, disk drives or computers being required. In this context, the computing unit may be configured in such a way that such a process can either be carried out in a completely automated fashion or by activation by a user, for example by means of an update pushbutton key or menu prompting at an input interface.

In this context, after identification of the charging device, for example via the supply network, new firmware may be transmitted to the charging device, for example via the supply network. The charging device may then carry out updating of its programming and starts again in at a suitable time. This may provide the producer with, in particular, the possibility of supplying a large number of such charging devices of a series or product batch with current firmware in a centralized fashion, for example via a power supply network, and as a result making the most up-to-date functions or updates available to the customer.

In a further embodiment, the charging device may include a computing unit with an interface for exchanging data with the energy store, in particular for transmitting a program code to the energy store in order to change or update programming of the energy store and/or to receive data from the energy store, in particular fault messages, maintenance requests and/or repair requests, wherein the charging device also has an interface for exchanging data via the Internet, a power supply network and/or via radio, in particular with a producer, a workshop and/or a power supplier.

This embodiment of the charging device may, on the one hand, be suitable for passing on to the energy store data, in particular program codes for changing or updating programming of the energy store, which have been received via the Internet, the power supply network and/or by radio. This may permit, in particular, updating of firmware of the energy store by the producer with all the advantages which have been described above in conjunction with corresponding programming of the charging device. In such a process, after identification of the energy store at the producer new firmware may be transmitted via the charging device, wherein the charging device exchanges the corresponding data between the producer and the energy store, for example via the supply network. After the reception of the firmware, a correspondingly configured battery can carry out updating and a subsequent restart.

This exchange of data between the energy store and the producer via the charging device may also provide the producer with the possibility of supplying a large number of energy stores of a series or product batch with current firmware in a centralized fashion via a power supply network and as a result making the most up-to-date functions or updates available to the customer. In addition there may be the possibility of transmitting data from the energy store to the charging device in order to transfer the charging parameters to the charging device and/or therefrom to, for example, the producer via the power supply network, for example. In this way it may be possible, for example, for a producer or a service device to process fault codes or a request to exchange the energy store in a centralized fashion. It may therefore be possible, for example, to provide the user of the energy store with prompt exchange of the energy store if said user has signaled an imminent failure via the charging device.

A further possible advantage of such a bidirectional data exchange between the charging device and the energy store is the possibility of a starting signal from the energy store being received by the charging device, as a result of which, in particular, corresponding to the description further above, a charging process can be triggered by the charging device.

In addition, charging parameters by which the charging device can be configured can be transmitted from the energy store to the charging device. Such charging parameters may contain technical features of the energy store such as, for example, a charging capacity or lower limits and upper limits for permissible charging power levels or charging currents.

In one embodiment of the charging device, the charging device may include a computing unit with an interface for exchanging data with a device, in particular an electric vehicle, connected to the charging device, in particular for transmitting a program code in order to change or update programming of the device and/or to receive data from the device, in particular fault messages, operating information, maintenance requests and/or repair requests, wherein the charging device also has an interface for exchanging data via the Internet, a power supply network and/or via radio, in particular with a producer, a workshop and/or a power supplier.

The exchanged data may, in particular if the device is an electric vehicle, contain a recall of the vehicle to a workshop which can be transmitted from the producer or a workshop to the vehicle via the charging device, or else an advertisement of products or services. In addition, information such as routes, breakdowns etc. can be passed on from the vehicle to the manufacturer or to a workshop. Furthermore, it may be possible in this way for, in particular, the programming of an on-board navigator of the vehicle to be updated or for that of another control unit of the vehicle to be updated, with the above-mentioned advantages of such programming by means of the charging device being obtained again.

The specific interface for exchanging data with the device connected to the charging device may also include, in particular, the energy store, i.e. the device is therefore connected to the charging device via the energy store for the exchange of data. Alternatively, the specified interface can also be implemented by means of a direct connection between the charging device and the respective device, for example by means of additional connections and cables or by means of a cableless interface.

Further, some embodiments may provide a method for operating a charging device for an energy store, for example for an electrochemical and/or electrostatic energy store, in particular for a lithium ion battery in an electric vehicle, wherein the charging device is switched into a fully charging mode or a parked charging mode, wherein in the fully charging mode a fully charged state is produced by the charging device, and in the parked charging mode a parked charge state of the energy store is produced, wherein the parked charge state corresponds to a reduced charge state of the energy store as has been described above. By setting the parked charge state to a charge state which is reduced compared to the fully charged state during a period in which the energy store is not actively used, the service life of said energy store may be lengthened by reduced calendar aging.

In a particular embodiment of the method, the charging device may be operated on a standard basis in the fully charging mode and/or in the parked charging mode by activating a parking pushbutton key (when the vehicle is parked for a relatively long time at an airport, for example).

Further, certain embodiments of the method may permit particularly good cost control of the charging process, and may allow environmental aspects and programming of a future charging process to be taken into account, while also taking into account external temperature information, the charging process is carried out with a charging device as disclosed herein.

Further, certain embodiments may provide an electric vehicle having a charging device as disclosed herein, wherein the charging device is either integrated into the electric vehicle as what is referred to as an on-board charger or is configured as a stationary charging device. Such an electric vehicle has the advantage that an electrochemical and/or electrostatic energy store which is contained in such an electric vehicle can be particularly easily placed in a parked charge state, with the result that the service life of this energy store can be particularly effectively lengthened in this way. This may lead to an improved performance of the electric vehicle and to a considerable reduction in costs through significantly lengthened changing intervals of the energy store.

FIG. 1 illustrates an example of a charging device according to certain embodiments. The charging device 1 may be connected to an energy store 2. The energy store 2 is a lithium ion battery in this exemplary embodiment, but the energy store could, however, equally well be, for example, a led acid battery or a nickel metal hybrid battery. The charging device 1 may have a circuit 3 with which the charging device 1 can be set to a fully charging mode or a parked charging mode. The charging device may be configured to produce a fully charged state of the energy store 1 in the fully charging mode. In the parked charging mode, the charging device 1 may be configured to produce a parked charge state of the energy store 1, wherein the parked charge state is defined by a reduced quantity of energy stored in the energy store (in comparison with a maximum quantity of energy which can be stored in the energy store). The illustrated charging device is set on a standard basis to the fully charging mode. The charging device may have a parking pushbutton key 4 for activating the parked charging mode. The charging device 1 is also configured to pass on energy extracted from the energy store 2. For this purpose, the charging device 1 may comprise a module 5 for feeding back the energy extracted from the energy store into a power supply network 6. During such feeding back, the module, which is configured as a power inverter module, may convert a voltage which is taken up from the energy store into an alternating voltage which is synchronized with an alternating voltage of a power supply network.

In order to charge the energy store 2, the charging device 1 may be firstly connected to the energy store 2 and to the power supply network 6. On a standard basis, in this way the energy store 2 may be completely charged up to a maximum quantity of energy which can be stored in the energy store. By activating the parking pushbutton key 4, the charging device may be switched over from the fully charging mode into the parked charging mode. In the parked charging mode, the energy store 2 may be placed in the parked charge state with the reduced quantity of energy stored. The reduced quantity of energy corresponds in this example to approximately 60% of the maximum quantity of energy which can be stored. Such a reduced charge state is particularly well suited for lengthening the service life of lithium ion batteries.

If the energy store 2 is in an instantaneous charge state with an instantaneously stored quantity of energy which is larger than the reduced quantity of energy which is associated with the parked charge state and if the charging device is in the parked charging mode, a corresponding quantity of energy may be extracted from the energy store by the charging device until the parked charge state of the energy store is reached. The extracted energy is fed back into the power supply network 6 via the module 5.

Figure 2:
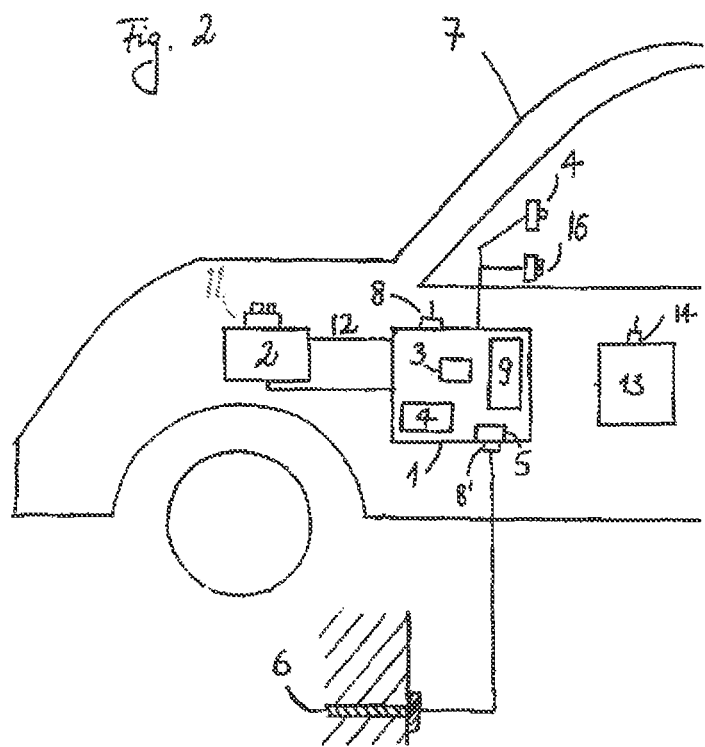
FIG. 2 shows a schematic illustration of an electric vehicle equipped with a charging device, according to certain embodiments of the present disclosure.

FIG. 2 is a schematic illustration of an example electric vehicle 7 with a charging device 1 and an energy store 2, according to certain embodiments. The charging device may be connected to a power supply network 6 for charging the energy store 2. As in the preceding example, this charging device 1 may also include a parking pushbutton key 4 with which the charging device can be placed in a parked charging mode via the circuit 3. The parking pushbutton key 4 may advantageously be arranged in the driver's compartment of the electric vehicle 7. The charging device may be configured to produce a fully charged state of the energy store 2 in a fully charging mode and a parking charge state of the energy store 2 with a reduced quantity of energy stored in the parked charging mode. The charging device 1 is set on a standard basis to the fully charging mode and is switched to the parked charging mode by activating the parking pushbutton key 4.

If the charging device 1 is in the parked charging mode and if the energy store 2 is in an instantaneous charge state with a stored quantity of energy which is greater than the reduced quantity of energy which is associated with the parked charge state, after the charging device has been activated so much energy may be extracted from the energy store 2 by the charging device 1 that the parked charge state of the energy store 2 is set, that is to say the reduced quantity of energy is reached. If the vehicle is switched off, as is illustrated in FIG. 2, and the charging device 1 is connected to the power supply network 6, the energy extracted may be fed back into the power supply network 6 via a module 5. Alternatively, this energy which is extracted from the energy store 2 can also be passed on to consumers which are connected to the energy stores (not illustrated here). This may be advantageous particularly when the vehicle is not connected to a power supply network 6, that is to say during a journey.

The charging device 1 may have a first interface 8 for receiving and evaluating an activation signal, transmitted to the charging device, for producing the fully charged state or the parked charge state of the energy store 2. If the energy store 2 in the parked electric vehicle 7 is thereibre in a parked state and if a corresponding activation signal is transmitted by a user and is received by the charging device 1 via the first interface 8, the charging device 1 may automatically produce the fully charged state of the energy store 2. In this way, the energy store may be largely protected by the parked charge state during parking of the electric vehicle 7, and the energy store 2 may be completely charged (the fully charged state is set) in good time before a planned journey in order in this way to achieve maximum range of the electric vehicle 7. In the example illustrated here, this activation signal may be transmitted to the charging device 1 by a mobile radio telephone via an SMS. Alternatively, a connection to the Internet can also be set up via the first interface 8, for example also by radio, with the result that a corresponding activation signal can be sent to the charging device 1 via the Internet.

The charging device may also be configured to carry out a charging process with a target time and a target charge state, wherein the charging device 1 has a computing unit 9 for calculating a starting time of the charging process and of the target charge state on the basis of a current charge state of the energy store 2, available charging power of the power supply network 6, the target time and a planned energy consumption, wherein the charging device 1 also has an input interface 10 for inputting the target time and the planned energy consumption. If a journey with the electric vehicle 7 is planned at a future time, the target time can be input via the input interface 10. This may advantageously be done in a format with a time of day and a date. In addition, a planned length of journey in kilometers is input via this interface. The computing unit may be programmed in such a way that the starting time of the charging process and the target charge state are calculated on the basis of these inputs, by means of the current charge state of the energy store 2 and the available charging power of the power supply network 6. In the time up to the starting time of this charging process, the energy store 2 may be automatically placed in the parked charging state in order to lengthen the service life of the energy store 2 as much as possible.

In some embodiments, the energy store 2 is not placed by the charging device in a charge state with a stored quantity of energy which corresponds to the target charge state until the starting time of the vehicle, wherein this quantity of energy may be calculated in such a way that it is sufficient for the journey of the length which is input, wherein the starting time of the charging process has been calculated by means of the prescribed values for the route, available charging power etc. Alternatively, the target time and planned energy consumption can also be input by SMS or via the Internet by means of the first interface 8.

The charging device 1 may also be configured to receive temperature information via the first interface 8 from a specific service provider for weather information and temperature information. The reception could also be equally well implemented via a further interface which is configured for the reception of weather information and temperature information. For example, this information could also be received via a second interface 8' which is connected to the power supply network if this information is made available via the power supply network. Furthermore, the charging device 1 has temperature sensors 16 for measuring an ambient temperature. Likewise, the energy store 2 may have temperature sensors 11 for measuring a temperature of the energy store 2. The temperature information which is measured with the temperature sensor 11 may be transmitted from the energy store 2 to the charging device 1 by means of a cable 12. Alternatively, this transmission can also take place in a wireless fashion by means of a corresponding transmitter in the energy store 2 and a receiver in the charging device 1. The computing unit 9 may be configured to process this temperature information from the temperature sensor 11 in the energy store 2, the temperature information of the temperature sensor 16 in the charging device 1 and the temperature information and weather information which is received via the first interface 8. The temperature information which is received from the service provider can alternatively also be received from the supply network 6 or via radio or GPS via specific weather services. In this context, this received temperature information can be present on a daily updated basis or else for a relatively long time period in the form of a weather forecast.

For this purpose, the computing unit may be configured to extract the temperature information from the weather information. On the basis of a future temperature profile which is created in this way, the computing unit adapts a charge current over time in such a way that temperature-induced aging is reduced as far as possible. It may therefore be possible, in particular at low temperatures, to prevent lithium plating and as a result a reduction in the battery service life, and to prevent rapid aging at high temperatures.

The computing unit 9 may also be configured to process information about at least one power supplier, in particular regarding power costs, a network utilization factor and/or energy generating methods and to calculate a chronological charging power profile and/or to select the power supplier on the basis of a charging strategy implemented in the computing unit 9, while taking into account the received information. In this context, the information about the power supply network 6 is received via the second interface 8'. However, said information can in principle equally well be received via the interface 8 via radio, the Internet and/or GPS. If the user is, for example, interested in a reduction of energy costs, said user sets a charging strategy by means of which the chronological charging power profile is optimized in such a way that the largest possible quantity of energy is drawn from a power provider with the most cost-effective power tariff possible. The computing unit may therefore assume the function of a least cost router in which tariff information from various power providers is compared and the most favorable tariff is selected. Such tariff information with associated switching times of the power providers is drawn on a daily updated basis via the power supply network. In this context, the computing unit may be programmed in such a way that even during a charging process it is possible to switch over to the most cost-effective power provider with automatic registration with said power provider. If the user is interested in using energy which is generated in the most environmentally friendly way possible, he may select a charging strategy by means of the computing unit in such a way that a quantity of energy which is as large as possible is drawn from renewable energy sources, wherein the corresponding information can also be received on a daily updated basis. When a chronological charging power profile is calculated, information about the network utilization factor of the power providers may likewise also be evaluated. In this way, in particular at peak load times it may be possible to achieve homogenization of a network utilization factor, with the result that the electric vehicle can be used as a peak load buffer for power plants, and the costs for charging the energy store 2 can be reduced (charging at an off-peak night rate).

If there is no information available about the network utilization factor, the computing unit may be configured to determine the network utilization factor itself by means of an evaluation of a network voltage and a network frequency in the power supply network 6 by means of an internal analysis (for example on the basis of a fast Fourier transformation, FFT for short), and to use such a utilization factor analysis for the calculation of an optimum charging power profile. For this purpose, in particular the Fourier transformand of the network voltage may be calculated. The network utilization factor may be measured on the basis of the presence of components of the Fourier transformands of the network voltage which are associated with a frequency which differs from a setpoint frequency. If components of the network voltage which differ from a setpoint frequency of the network voltage by more than a predefined maximum threshold value are measured in this way, a charging process may be interrupted and/or postponed to a later time. In this way, a charging power profile may be adapted to the utilization factor of the power supply network and peak utilization factors are reduced. In this exemplary embodiment 10 Hz is permanently predefined as a maximum threshold value. However, a larger or smaller threshold value can equally well also be predefined.

In addition, a device for emitting an identification code to a power supplier and a producer via the second interface 8' and the power supply network 6 may also be integrated into the charging device. In this way, a corresponding identification code may be emitted before or during the charging process, with the result that a power provider identifies the electric vehicle as such and, if appropriate, calculates a reduced power tariff. Furthermore, such identification may be necessary in order to achieve more favorable tax treatment for electric vehicles.

The computing unit 9 may be configured to process a program code in order to change or update programming of the computing unit 9, in particular firmware of the computing unit 9. Corresponding reception of such a program code via the power supply network 6 and the second interface 8 may either be activated by the user 6 via a user interface 10 or may take place in an automated fashion by means of the charging device. In this context, after automated emission of an identification code via the power supply network, the computing unit may receive new firmware data via the power supply network, carries out updating and starts again at a suitable time. Alternatively, the updating of the firmware can be triggered manually by a user via the user interface 10 by means of an update pushbutton key or menu prompting. Such an update is also possible by means of an external computer which is connected to the charging device 1 for example via a radio link via the first interface 8 or in a cable-bound fashion.

The computing unit 9 may also be configured to exchange data with the energy store 2 via the connection 12. In this way, program codes may be transmitted to the energy store 2 in order, for example, to carry out updating of the firmware of the energy store 2. Furthermore, data from the energy store, in particular fault messages, maintenance requests and/or repair requests, may also be received via this connection 12. However, as an alternative to the cable-bound interface 12, a cableless connection, for example via radio, between the energy store 2 and the charging device 1 is equally well possible. The data which are received from the energy store 2 are subsequently passed on to a producer of the energy store 2 via the interface 8' via the power supply network.

Furthermore, a starting signal for a charging process which a user has transmitted to the energy store may be passed on from the energy store to the charging device, as a result of which a charging process of the energy store is triggered by the charging device.

Furthermore, charging parameters, by means of which the charging device is configured, may be transmitted from the energy store to the charging device. These charging parameters include technical features of the energy store, such as for example a charging capacity or lower limits and upper limits for permissible charging powers or charging currents. In this way, the charging device is adjusted precisely to the energy store at any time.

In addition, the charging device 1 may be connected to the computing unit 9 via the first interface 8 by radio in order to exchange data with a control device 13, which also has a corresponding interface 14. For example program codes for changing or updating programming of the control device 13 may be transmitted via this connection, with the result that updates of firmware of the control device 13 can be carried out. Furthermore, data, in particular fault messages, operating information, maintenance requests and/or repair requests, are transmitted from the control unit 13 to the charging device 1 via this connection. These data may be passed on via the power supply network 6 to a producer of the control device 13 or a workshop via the interface 8'. In addition to the control device 13, further control devices or other energy consumers in the electric vehicle 7 can also be connected to the charging device in a cableless or cable-bound fashion for such an exchange of data. In this way it is possible, in particular, to carry out updating of software of an on-board navigation system.

Furthermore, a starting signal for a charging process which has been transmitted to this control device may be passed on from the control device to the charging device, as a result of which a charging process of the energy store is triggered by the charging device.

What is claimed is:

1. A charging device for an energy store comprising a lithium ion battery in an electric vehicle, wherein the charging device comprises:
   a circuit for setting the charging device to a fully charging mode or a parked charging mode,
   wherein the charging device is configured to produce a fully charged state of the energy store in the fully charging mode and to produce a parked charge state of the energy store in the parked charging mode,
   wherein the parked charge state corresponds to a specified reduced charge state of the energy store, and
   a controller configured to:
      determine whether the charging device is set to the fully charging mode or the parked charging mode,
      determine a current charged state of the energy store, and
      in response to determining that the charging device is set to the parked charging mode:
         comparing the current charged state of the energy store to the specified reduced charge state corresponding to the parked charging mode,
         in response to determining that the current charged state of the energy store is below the specified reduced charge state corresponding to the parked charging mode, automatically initiating a charging of the energy store from a power supply network, and
         in response to determining that the current charged state of the energy store is above the specified reduced charge state corresponding to the parked charging mode, automatically initiating an extraction of energy from the energy store and feeding of the extracted energy back into the power supply network.

2. The charging device of claim 1, wherein the fully charging mode is activated on a standard basis and the charging device has a parking pushbutton key for activating the parked charging mode.

3. The charging device of claim 1, wherein the charging device has an interface for receiving and evaluating an activation signal, transmitted to the charging device, for producing the fully charged state or the parked charge state of the energy store.

4. The charging device of claim 1, wherein the charging device is configured to carry out a charging process with a target time and with a target charge state, wherein the charging device includes a computing unit for calculating a starting time of the charging process and of the target charge state on the basis of a current charge state of the energy store, available charging power of the power supply network, the target time and a planned energy consumption, wherein the charging device also has an input interface for inputting the target time and the planned energy consumption.

5. The charging device of claim 1, wherein the charging device has a computing unit and an interface for receiving temperature information, wherein the charging device is configured to calculate a chronological charging power profile on the basis of a charging strategy, implemented in the computing unit, taking into account the temperature information.

6. The charging device of claim 1, wherein the charging device has a computing unit and an interface for receiving information about at least one power supplier, wherein the information is selected from group the consisting of: power costs, a network utilization factor and power generating methods, wherein the charging device is configured to calculate a chronological charging power profile and to select the power supplier on the basis of a charging strategy, implemented in the computing unit, taking into account the received information.

7. The charging device of claim 1, wherein the charging device has a computing unit and an interface for receiving and automatically processing a program code for changing or updating programming of the computing unit.

8. The charging device of claim 1, wherein the charging device is configured to emit an identification code to the power supplier.

9. The charging device of claim 1, wherein the charging device comprises a computing unit with an interface for exchanging data with the energy store, wherein the computing unit transmits via the interface a program code to the energy store in order to change or update programming of the energy store and to receive data from the energy store, wherein the data is selected from group the consisting of: fault messages, maintenance requests and repair requests, wherein the charging device further comprises an interface for exchanging data with a power supplier.

10. The charging device of claim 1, wherein the charging device comprises a computing unit with an interface for exchanging data with an electric vehicle, connected to the charging device, wherein the computing unit transmits via the interface a program code in order to change or update programming of the device and to receive data from the device, wherein the data is selected from group the consisting of: fault messages, operating information, maintenance requests and repair requests, wherein the charging device further comprises an interface for exchanging data with a power supplier.

11. The charging device of claim 1, wherein the charging device includes a computing unit which is configured to carry out a utilization analysis of the power supply network on the basis of an analysis of a network voltage and a network frequency in the power supply network, and to calculate a chronological charging power profile on the basis of a programmed charging strategy taking into account the utilization analysis.

12. A method for operating a charging device for an energy store comprising a lithium ion battery in an electric vehicle, the method comprising:
   switching the charging device by means of a circuit into a fully charging mode or a parked charging mode, producing in the fully charging mode a fully charged state by the charging device, and producing in the parked charging mode a parked charge state of the energy store, wherein the parked charge state corresponds to a specified reduced charge state of the energy store, determining, by a controller, whether the charging device is set to the fully charging mode or the parked charging mode, determining, by the controller, a current charged state of the energy store, and in response to determining that the charging device is set to the parked charging mode:

comparing, by the controller, the current charged state of the energy store to the specified reduced charge state corresponding to the parked charging mode, in response to determining that the current charged state of the energy store is below the specified reduced charge state corresponding to the parked charging mode, automatically initiating, by the controller, a charging of the energy store from a power supply network, and in response to determining that the current charged state of the energy store is above the specified reduced charge state corresponding to the parked charging mode, automatically initiating, by the controller, an extraction of energy from the energy store and feeding of the extracted energy back into the power supply network.

13. An electric vehicle having a charging device comprising:

a circuit for setting the charging device to a fully charging mode or a parked charging mode, wherein the charging device is configured to produce a fully charged state of an energy store in the fully charging mode and to produce a parked charge state of the energy store in the parked charging mode, wherein the parked charge state corresponds to a specified reduced charge state of the energy store, and a controller configured to:

determine whether the charging device is set to the fully charging mode or the parked charging mode, determine a current charged state of the energy store, and in response to determining that the charging device is set to the parked charging mode:

comparing the current charged state of the energy store to the specified reduced charge state corresponding to the parked charging mode, and in response to determining that the current charged state of the energy store is below the specified reduced charge state corresponding to the parked charging mode, automatically initiating a charging of the energy store from a power supply network, and in response to determining that the current charged state of the energy store is above the specified reduced charge state corresponding to the parked charging mode, automatically initiating an extraction of energy from the energy store and feeding of the extracted energy back into the power supply network.

* * * * *